United States Patent
Bowman et al.

(10) Patent No.: US 9,928,388 B1
(45) Date of Patent: *Mar. 27, 2018

(54) SEQUENTIAL ENCODING FOR RFID TAGS

(71) Applicant: Impinj, Inc., Seattle, WA (US)

(72) Inventors: Daniel Bowman, Bellevue, WA (US); Kurt Sundstrom, Woodinville, WA (US); Christopher Diorio, Shoreline, WA (US)

(73) Assignee: IMPINJ, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,621

(22) Filed: Sep. 29, 2017

Related U.S. Application Data

(63) Continuation of application No. 15/600,302, filed on May 19, 2017, now Pat. No. 9,805,223, which is a continuation of application No. 14/153,737, filed on Jan. 13, 2014, now Pat. No. 9,697,387.

(60) Provisional application No. 61/752,361, filed on Jan. 14, 2013.

(51) Int. Cl.
*G06K 7/00* (2006.01)
*G06K 19/07* (2006.01)
*G06K 19/077* (2006.01)

(52) U.S. Cl.
CPC ....... *G06K 7/0008* (2013.01); *G06K 19/0723* (2013.01); *G06K 19/07749* (2013.01)

(58) Field of Classification Search
CPC ............. G06K 7/0008; G06K 19/0723; G06K 19/07749; G06K 17/00; G06F 11/1004
See application file for complete search history.

(56) References Cited

U.S. PATENT DOCUMENTS

| | | |
|---|---|---|
| 7,733,227 B1 | 6/2010 | Pesavento et al. |
| 9,041,513 B1 | 5/2015 | Pai et al. |
| 2002/0067265 A1 | 6/2002 | Rudolph |
| 2004/0196980 A1 | 10/2004 | Turner et al. |
| 2005/0120260 A1 | 6/2005 | Suzuki et al. |
| 2006/0026316 A1 | 2/2006 | Milenkovic et al. |
| 2006/0061482 A1 | 3/2006 | Monney et al. |
| 2006/0065730 A1 | 3/2006 | Quan et al. |
| 2006/0075233 A1 | 4/2006 | Turner et al. |
| 2006/0109126 A1 | 5/2006 | Yegnan et al. |
| 2006/0131377 A1 | 6/2006 | Zimmerman |
| 2006/0202032 A1 | 9/2006 | Kricorissian |
| 2006/0273883 A1 | 12/2006 | Pillai et al. |
| 2007/0011041 A1 | 1/2007 | Bourne |
| 2007/0069029 A1 | 3/2007 | Bauchot et al. |
| 2007/0159330 A1 | 7/2007 | Chakraborty et al. |
| 2007/0188306 A1 | 8/2007 | Tethrake et al. |
| 2008/0001723 A1 | 1/2008 | Schuessler |
| 2008/0165003 A1 | 7/2008 | Graichen et al. |

(Continued)

*Primary Examiner* — Orlando Bousono
(74) *Attorney, Agent, or Firm* — Turk IP Law, LLC

(57) ABSTRACT

Embodiments are directed to sequential encoding for RFID tags. An encoding line transports an RFID tag from the reading zone of a first reader to the reading zone of a second reader. The first reader communicates with the tag, writes a portion of an identifier to the tag, and sends a tag write status to the second reader. The second reader, situated after the first reader, communicates with the tag, receives the tag write status from the first reader, then determines a remaining portion of the identifier to be written to the tag based on the tag write status. The second reader then attempts to write the remaining portion to the tag. If the attempt fails, the second reader initiates an error-handling procedure.

19 Claims, 9 Drawing Sheets

(56) References Cited

U.S. PATENT DOCUMENTS

| | | |
|---|---|---|
| 2008/0165007 A1 | 7/2008 | Drago et al. |
| 2009/0033493 A1 | 2/2009 | Lin et al. |
| 2010/0090809 A1 | 4/2010 | Yeo et al. |
| 2010/0194545 A1 | 8/2010 | Wong |
| 2010/0238039 A1 | 9/2010 | Tethrake et al. |
| 2012/0007721 A1 | 1/2012 | Whitaker et al. |
| 2013/0049962 A1 | 2/2013 | Smith et al. |
| 2013/0241713 A1 | 9/2013 | Weinländer |
| 2014/0065957 A1 | 3/2014 | Gupta et al. |

*SIGNAL PATH DURING R→T*

*SIGNAL PATH DURING T→R*

*REID READER SYSTEM DETAIL*

SEQUENTIAL ENCODING FOR RFID TAGS

CROSS REFERENCE TO RELATED APPLICATIONS

This Application is a continuation under 35 U.S.C. § 120 of co-pending U.S. patent application Ser. No. 15/600,302 filed on May 19, 2017, which is a continuation under 35 U.S.C. § 120 of U.S. patent application Ser. No. 14/153,737 filed on Jan. 13, 2014, now U.S. Pat. No. 9,697,387, issued on Jul. 4, 2017, which claims the benefit under 35 U.S.C § 119 (e) of U.S. Provisional Patent Application Ser. No. 61/752,361 filed on Jan. 14, 2013. The U.S. Patent Applications and the U.S. Provisional Application are hereby incorporated by reference in their entireties.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In earlier RFID tags the power-management section included an energy storage device such as a battery. RFID tags with an energy storage device are known as battery-assisted, semi-active, or active tags. Advances in semiconductor technology have miniaturized the electronics so much that an RFID tag can be powered solely by the RF signal it receives. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to sequential encoding for RFID tags. A first reader communicates with an RFID tag, writes a portion of an identifier to the tag, and sends a tag write status to the second reader. An encoding line transports the tag from the first reader's reading zone to the reading zone of a second reader situated after the first reader. The second reader communicates with the tag, receives the tag write status from the first reader, then determines a remaining portion of the identifier to be written to the tag based on the tag write status. The second reader then attempts to write the remaining portion to the tag. If the attempt fails, the second reader initiates an error-handling procedure.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions. "Protocol" refers to an industry standard for communications between a reader and a tag (and vice versa), such as the Class-1 Generation-2 UHF RFID Protocol for Communications at 860 MHz-960 MHz by GSI EPCglobal, Inc. ("Gen2 Specification"), versions 1.2.0 and 2.0.0 of which are hereby incorporated by reference.

Figure 1:
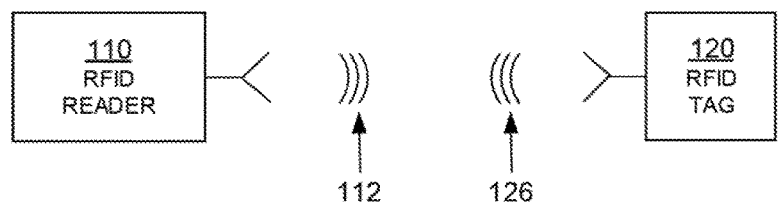
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
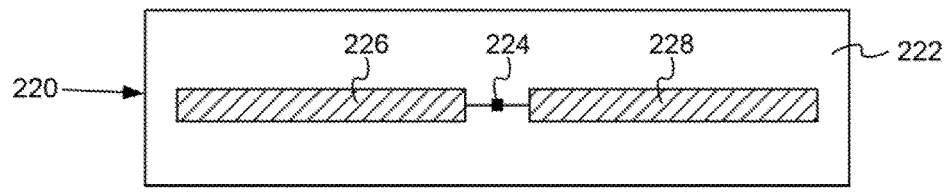
FIG. 2 is a diagram showing components of a passive RFID tag, such as a tag that can be used in the system of FIG. 1.
Figure 2:
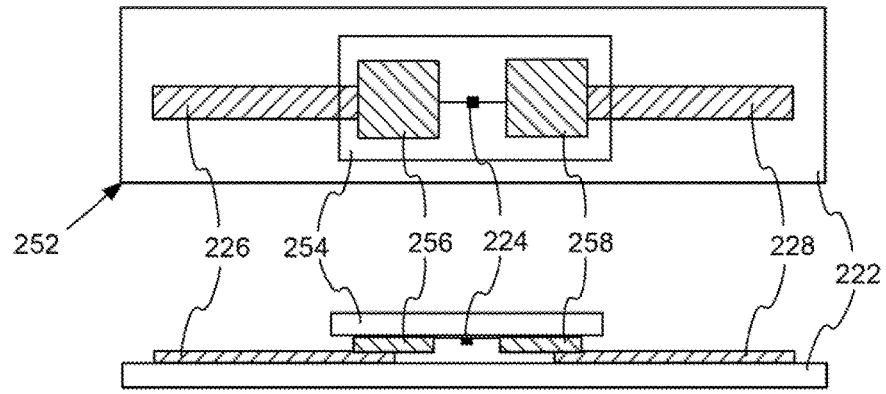
Figure 2:
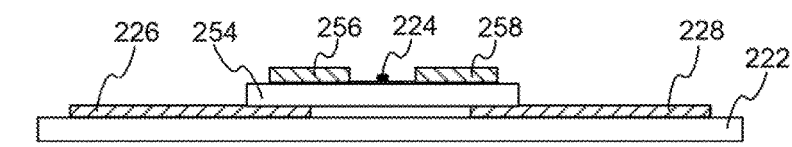

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable antenna contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive.

IC 224 is shown with a single antenna port, comprising two antenna contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the antenna contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath strap substrate 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the antenna contacts of IC 224 can modulate the antenna's reflectance, as can varying the admittance of a shunt-connected circuit element which is coupled to the antenna contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

Figure 3:
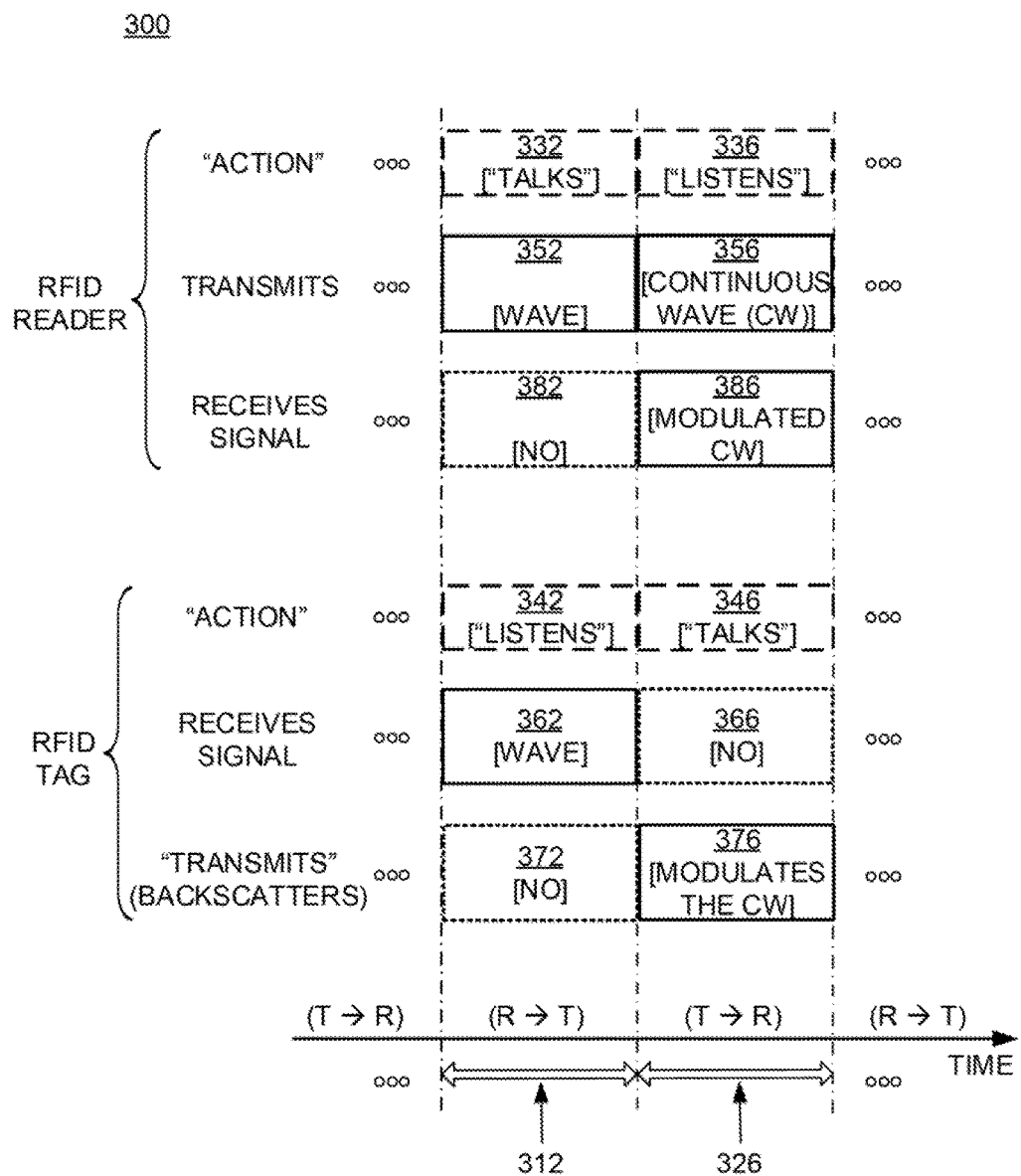
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
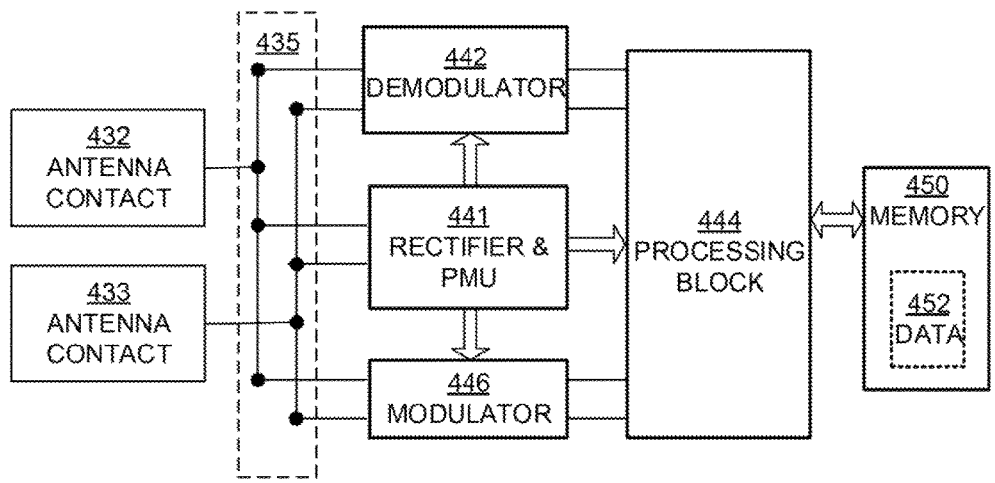
FIG. 4 is a block diagram showing a detail of an RFID tag, such as the one shown in FIG. 2.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as segments 226 and 228 of RFID tag 220 of FIG. 2. When two IC contacts form the signal input from, and signal return to, an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 also includes signal-routing section 435 which may include signal wiring, a receive/transmit switch that can selectively route a signal, and so on.

Circuit 424 also includes a rectifier and PMU (Power Management Unit) 441 that harvests energy from the RF signal received by antenna segments 226 and 228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
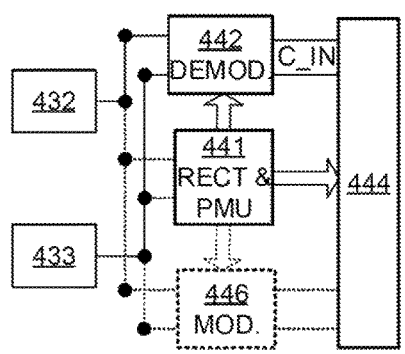
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
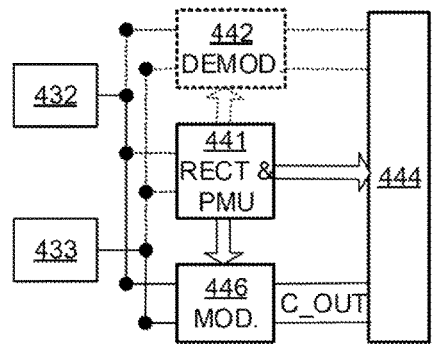

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol is a specification that calls for specific manners of signaling between the reader and the tags, and specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
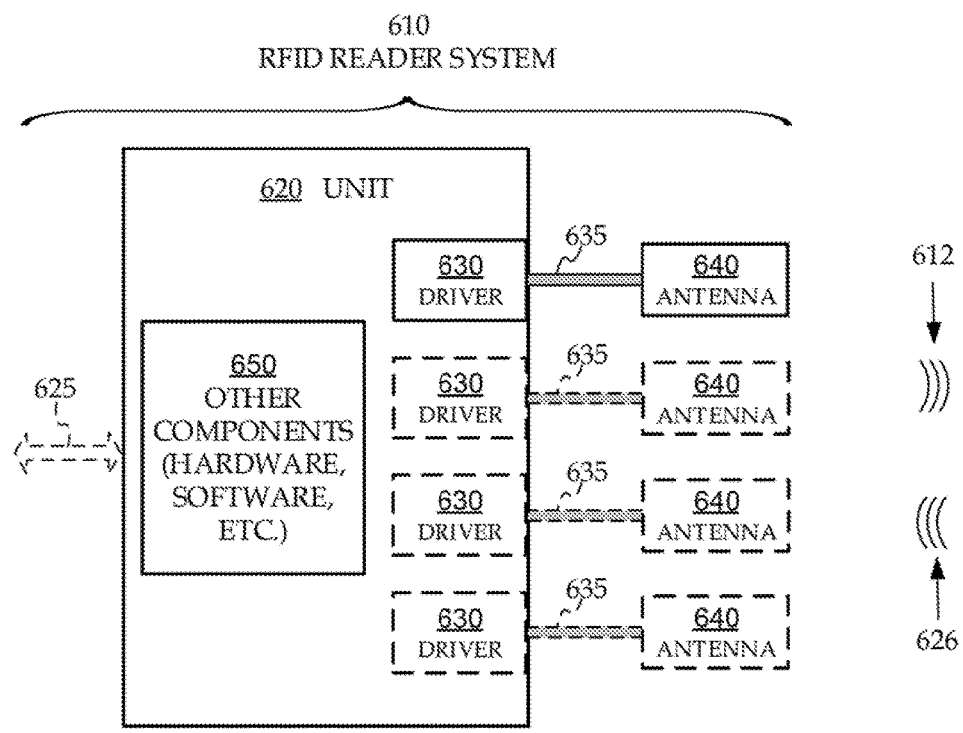
FIG. 6 is a block diagram showing a detail of an RFID reader system, such as the one shown in FIG. 1.

FIG. 6 is a block diagram showing a detail of an RFID reader system 610, which can be the same as reader 110 shown in FIG. 1. A unit 620 is also known as a reader 620, and has one or more antenna drivers 630. In some embodiments it has four drivers 630. For each driver 630 there is an output connector. Accordingly, connectors 635 can be attached to the outputs of the provided respective drivers 630, and then connectors 635 can be attached to respective antennas 640.

A driver 630 can send to its respective antenna 640 a driving signal that is in the RF range, which is why connector 635 is typically but not necessarily a coaxial cable. The driving signal causes the antenna 640 to transmit an RF wave 612, which is analogous to RF wave 112 of FIG. 1. In addition, RF wave 626 can be backscattered from the RFID tags, analogous to RF wave 126 of FIG. 1. Backscattered RF wave 626 is received by an antenna 640 and ultimately becomes a signal sensed by unit 620.

Unit 620 also has other components 650, such as hardware and/or software and/or firmware, which may be described in more detail later in this document. Components 650 control drivers 630, and as such cause RF wave 612 to be transmitted, and the sensed backscattered RF wave 626 to be interpreted. Optionally and preferably there is a communication link 625 to other equipment, such as computers and the like, for remote operation of reader system 610.

Figure 7:
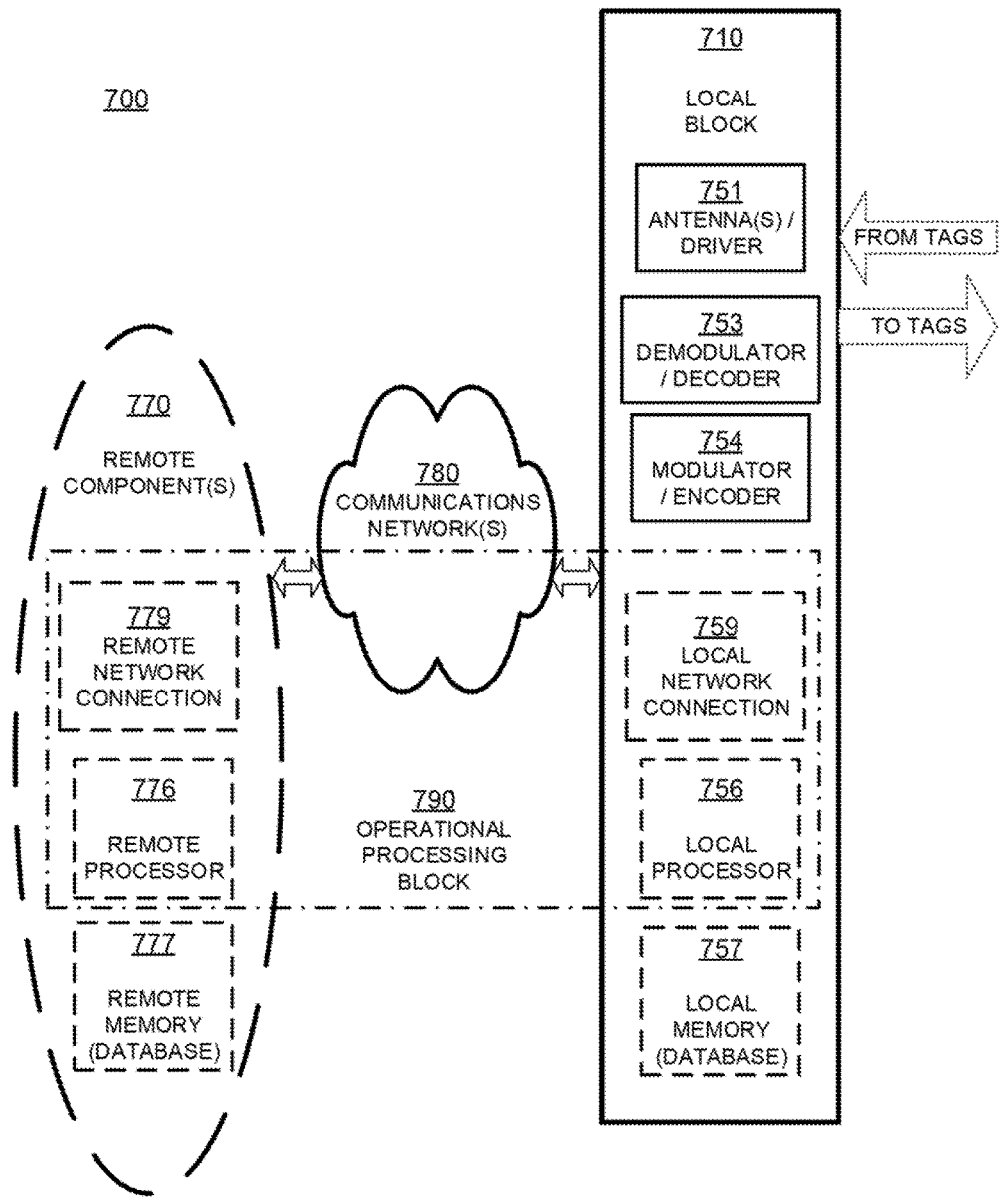
FIG. 7 is a block diagram of a whole RFID reader system according to embodiments.

FIG. 7 is a block diagram of an RFID reader system 700 according to embodiments. RFID reader system 700 includes a local block 710, and optionally remote components 770. Local block 710 and remote components 770 can be implemented in any number of ways. It will be recognized that RFID reader 110 of FIG. 1 is the same as local block 710, if remote components 770 are not provided. Alternately, RFID reader 110 can be implemented instead by RFID reader system 700, of which only the local block 710 is shown in FIG. 1.

Local block 710 is responsible for communicating with tags. Local block 710 includes a block 751 of an antenna and an antenna driver for communicating with the tags. Some readers, like that shown in local block 710, contain a single antenna and driver. Some readers contain multiple antennas and drivers and a method to switch signals among them, including sometimes using different antennas for transmitting and for receiving. Some readers contain multiple antennas and drivers that can operate simultaneously. A demodulator/decoder block 753 demodulates and decodes waves received from the tags via antenna/driver block 751. Modulator/encoder block 754 encodes and modulates RF waves that are to be transmitted to tags via antenna/driver block 751.

Local block 710 additionally includes an optional local processor 756. Local processor 756 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer, programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 753, the encoding function in block 754, or both, may be performed instead by local processor 756. In some cases local processor 756 may implement an encryption or authorization function; in some cases one or more of these functions can be distributed among other blocks such as encoding block 754, or may be entirely incorporated in another block.

Local block 710 additionally includes an optional local memory 757. Local memory 757 may be implemented in any number of ways known in the art, including, by way of example and not of limitation, any of the memory types described above as well as any combination thereof. Memory 757 can be implemented separately from local processor 756, or in an IC with local processor 756, with or without other components. Local memory 757, if provided, can store programs for local processor 756 to run, if needed.

In some embodiments, local memory 757 stores data read from tags, or data to be written to tags, such as Electronic Product Codes (EPCs), Tag Identifiers (TIDs) exit codes (ECs), ownership codes (OCs), and other data. Local memory 757 can also include reference data that is to be compared to the EPC, instructions and/or rules for how to encode commands for the tags, modes for controlling antenna 751, secret keys, key pairs, and so on. In some of these embodiments, local memory 757 is provided as a database.

Some components of local block 710 typically treat data as analog, such as antenna/driver block 751. Other components such as local memory 757 typically treat data as digital. At some point there is a conversion between analog and digital. Based on where this conversion occurs, a reader may be characterized as "analog" or "digital", but most readers contain a mix of analog and digital functionality.

If remote components 770 are provided, they are coupled to local block 710 via an electronic communications network 780. Network 780 can be a Local Area Network (LAN), a Metropolitan Area Network (MAN), a Wide Area Network (WAN), a network of networks such as the internet, or a local communication link such as a USB, PCI, and so on. Local block 710 may include a local network connection 759 for communicating with network 780. Communications on the network can be secure, such as if they are encrypted or physically protected, or insecure if they are not encrypted or otherwise protected.

There can be one or more remote component(s) 770. If more than one, they can be located at the same location, or in different locations. They can access each other and local block 710 via communications network 780, via other networks, and so on. Accordingly, remote component(s) 770 can use respective remote network connections. Only one such remote network connection 779 is shown, which is similar to local network connection 759, etc.

Remote component(s) 770 can also include a remote processor 776. Remote processor 776 can be made in any way known in the art, such as was described with reference to local processor 756. Remote processor 776 may also implement an encryption function, similar to local processor 756.

Remote component(s) 770 can also include a remote memory 777. Remote memory 777 can be made in any way known in the art, such as was described with reference to local memory 757. Remote memory 777 may include a local database or a database of a Standards Organization, such as one that can reference EPCs. Remote memory 777 may also contain information associated with command, tag profiles, keys, or the like, similar to local memory 757.

Of the above-described elements, it may be advantageous to consider a combination of these components, designated as operational processing block 790. Operational processing block 790 includes those components that are provided of the following: local processor 756, remote processor 776, local network connection 759, remote network connection 779, and by extension an applicable portion of communications network 780 that links remote network connection 779 with local network connection 759. The portion can be dynamically changeable. In addition, operational processing block 790 can receive and decode RF waves received via antenna 751, and cause antenna 751 to transmit RF waves according to what it has processed.

Operational processing block 790 includes either local processor 756, or remote processor 776, or both. If both are provided, remote processor 776 can be made such that it operates in a way complementary with that of local processor 756. In fact, the two can cooperate. It will be appreciated that operational processing block 790, as defined this way, is in communication with both local memory 757 and remote memory 777, if both are present.

Accordingly, operational processing block 790 is location independent, in that its functions can be implemented either by local processor 756, by remote processor 776, or by a combination of both. Some of these functions are preferably implemented by local processor 756, and some by remote processor 776. Operational processing block 790 accesses local memory 757, or remote memory 777, or both for storing and/or retrieving data.

RFID reader system 700 operates by operational processing block 790 generating communications for RFID tags. These communications are ultimately transmitted by antenna block 751, with modulator/encoder block 754 encoding and modulating the information on an RF wave. Then data is received from the tags via antenna block 751, demodulated and decoded by demodulator/decoder block 753, and processed by processing operational processing block 790.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 8:
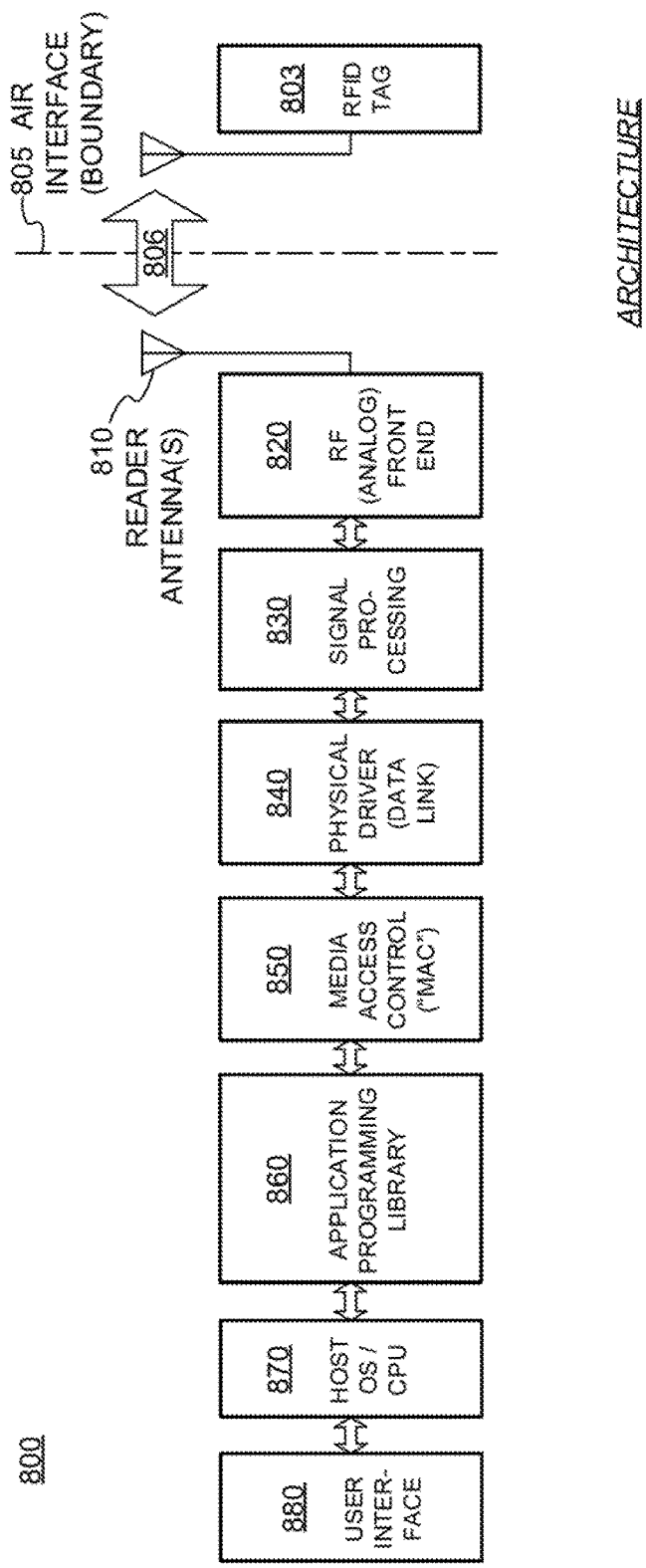
FIG. 8 is a block diagram illustrating an overall architecture of an RFID system according to embodiments.

FIG. 8 is a block diagram illustrating an architecture of an RFID reader 800 according to embodiments. For reasons of clarity, RFID reader 800 is subdivided into modules or components. Each of these modules may be implemented by itself, or in combination with others. In addition, some of them may be present more than once. Other embodiments may be equivalently subdivided into different modules. It will be recognized that some aspects of FIG. 8 are parallel with those described previously.

RFID tag 803 is considered here as a module by itself. RFID tag 803 conducts a wireless communication 806 with the remainder, via air interface 805. Air interface 805 is really a boundary, in that signals or data that pass through it are not intended to be transformed from one thing to another. Specifications as to how readers and tags are to communicate with each other, for example the Gen 2 Specification, also properly characterize that interface as a boundary.

RFID system 800 includes one or more reader antennas 810, and an RF front-end module 820 for interfacing with reader antenna(s) 810. These can be made as described above.

RFID system 800 also includes a signal-processing module 830. In one embodiment, signal-processing module 830 exchanges waveforms with RF front-end module 820, such as I and Q waveform pairs.

RFID system 800 also includes a physical-driver module 840, which is also known as data-link module. In some embodiments physical-driver module 840 exchanges bits with signal-processing module 830. Physical-driver module 840 can be the stage associated with the framing of data.

RFID system 800 additionally includes a media access control module 850. In one embodiment, module 850 exchanges packets of bits with physical driver module 840. Module 850 can make decisions for sharing the communication medium, which in this case is the air interface but in other embodiments could be a wired interface.

RFID system 800 moreover includes an application-programming library-module 860, which can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 870. In some embodiments, the processor is not considered as a separate module, but one that includes some of the above-mentioned modules of RFID system 800. In some embodiments the one or more processors may perform operations associated with calculating and/or writing an ownership code and/or an electronic signature as part of a loss-prevention or self-checkout system.

User interface module 880 may be coupled to application-programming-library module 860, for accessing the APIs. User interface module 880 can be manual, automatic, or both. It can be supported by the host OS/CPU module 870 mentioned above, or by a separate processor, etc.

It will be observed that the modules of RFID system 800 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other for transmitting RFID waveforms. In receiving mode, reader antenna(s) 810 receives wireless waves, which are in turn processed successively by the various modules in the chain. Processing can terminate in any one of the modules. In transmitting mode, waveform initiation can be in any one of the modules. Ultimately, signals are routed to reader antenna(s) 810 to be transmitted as wireless waves.

The architecture of RFID system 800 is presented for purposes of explanation, and not of limitation. Its particular subdivision into modules need not be followed for creating embodiments. Furthermore, the features of the present disclosure can be performed either within a single one of the modules, or by a combination of them. In some embodiments RFID system 800 can be incorporated into another electronic device such as a point-of-sale terminal in a retail facility or a consumer device such as a mobile phone.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

Everything described above in terms of readers and reader components finds some correspondence with tags and tag ICs, and vice versa. Numerous details have been set forth in this description, which is to be taken as a whole, to provide a more thorough understanding of the invention. In other instances, well-known features have not been described in detail, so as to not obscure unnecessarily the invention.

Figure 9:
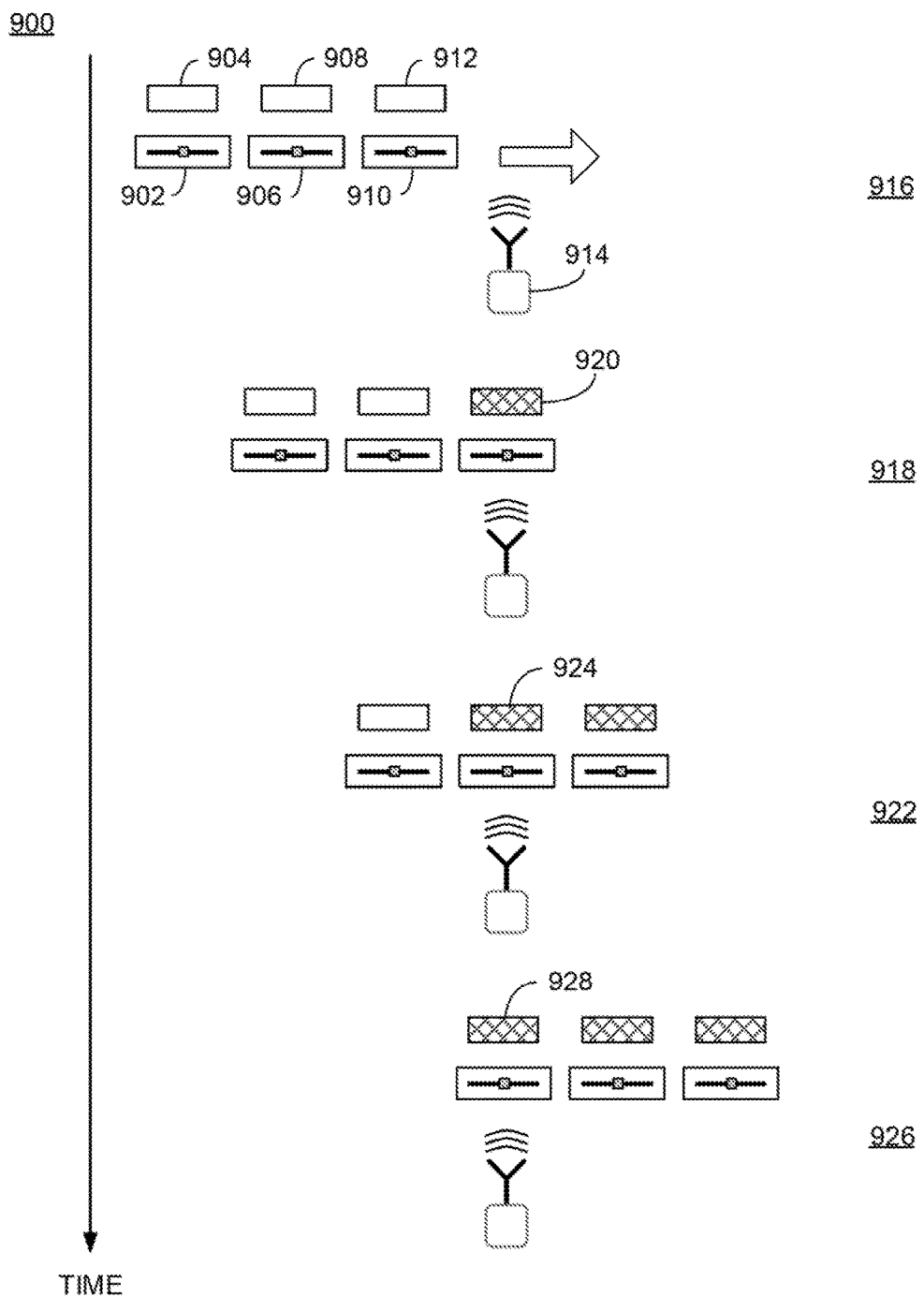
FIG. 9 depicts a process for writing data to RFID tags according to embodiments.

FIG. 9 depicts a process 900 for writing data to RFID tags according to embodiments. Process 900 is shown as a series of steps performed sequentially at different times, as shown by the TIME axis on the left, with higher steps occurring before lower steps.

At time 916, a number of RFID tags 902, 906, and 910, each with a corresponding IC, may be arranged to pass sequentially by an RFID reader 914, for example on a conveyer belt, an inlay web, or any other suitable encoding line or tag conveyance. In FIG. 9 the RFID tags are shown to move from left to right (as indicated by the block arrow at time 916) by the reader 914. Each tag may have one or more portions of unencoded or unwritten memory. For example, tag 902 may have unwritten memory 904, tag 906 may have unwritten memory 908, and tag 910 may have unwritten memory 912. In some embodiments, the unwritten/unencoded memory 904, 908, and 912 may be blank, may store random data, or may store data to be overwritten.

At time 918, reader 914 detects RFID tag 910 and writes data 920 to memory 912. Subsequently, at time 922, reader 914 detects RFID tag 906 and writes data 924 to memory 908. Finally, at time 926, reader 914 detects RFID tag 902 and writes data 928 to memory 904. In some embodiments, reader 914 receives data 920, 924, and 928 from an external source, such as a controller, a network server, or similar.

In general, the time it takes to write data to a tag is directly related to the size of the data. For example, it may take longer to write a 32-bit code to a tag than it takes to write a 16-bit code. Therefore, in process 900, tag encoding throughput (i.e., how quickly tags can be encoded) may be limited by how quickly the reader 914 can write the entire desired data/code to the memory of a tag.

Figure 10:
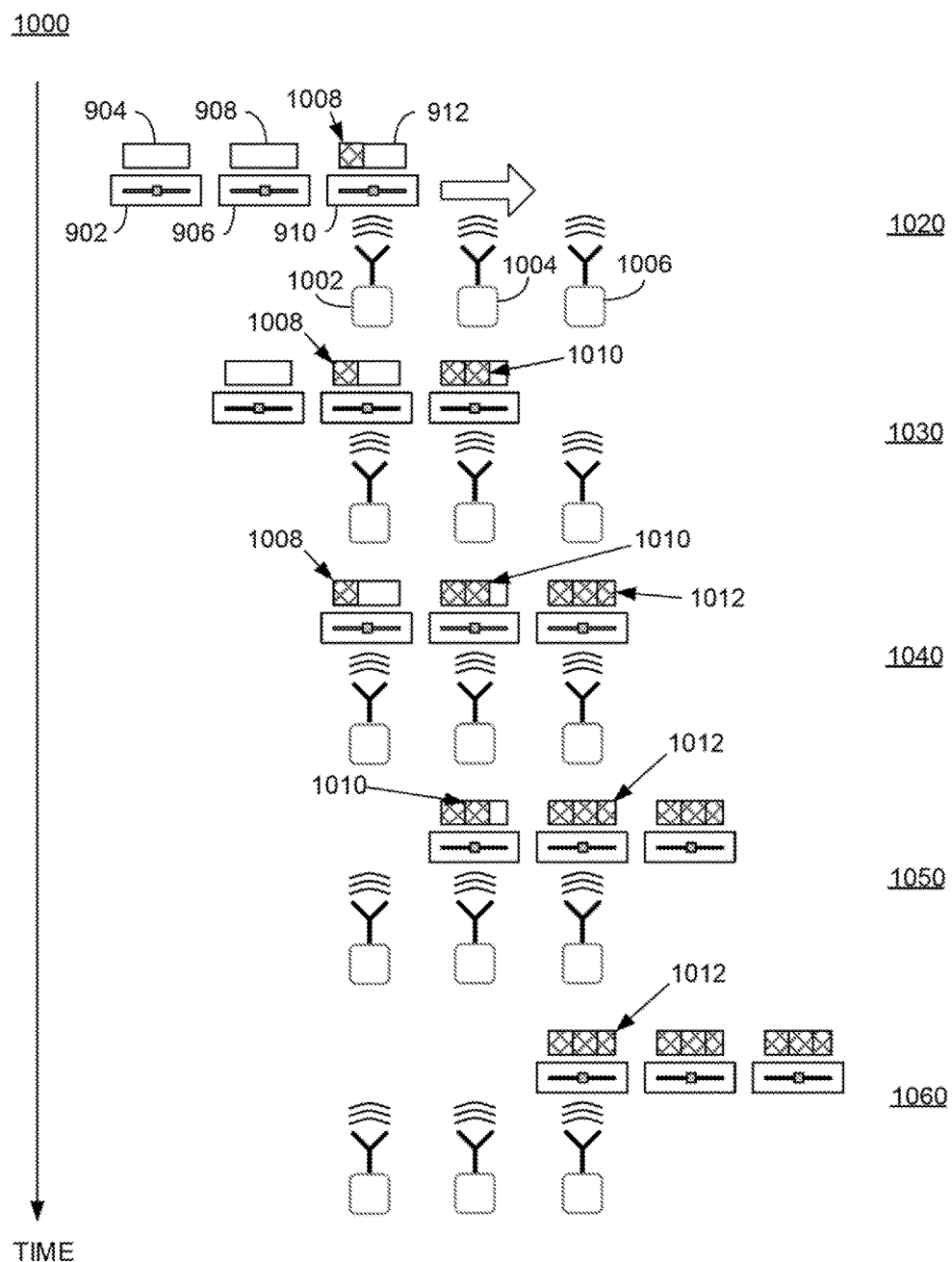
FIG. 10 depicts a sequential process for writing data to RFID tags according to embodiments.

FIG. 10 depicts a process 1000 for sequentially writing data to RFID tags according to embodiments. Process 1000 is similar to process 900, with similarly-numbered elements behaving similarly. As with process 900, process 1000 involves a number of RFID tags 902, 906, and 910 having memory 904, 908, and 912, respectively. However, process 1000 also involves multiple RFID readers 1002, 1004, and 1006. Each of the readers 1002, 1004, and 1006 may be configured to sequentially write a different code or a different portion of a code to a tag. The readers may sequentially write data to a tag by having reader 1002 write data to the tag before reader 1004 does. Reader 1004 then writes data to the tag before reader 1006 does, and reader 1006 writes data to the tag before subsequent readers (if any) do. The code to be written may include electronic product codes (EPCs), tag identifiers (TIDs), other identifiers, keys, hashes, and/or other data, and may be provided by an external source as described above in FIG. 9. Readers 1002-1006 are situated sequentially along the direction of travel of tags 902, 906, and 910, such that a tag enters the field-of-view or reading zone of reader 1002 before entering the reading zone of reader 1004, and then subsequently entering the reading zone of reader 1006. A reader's reading zone is the spatial region in which the reader can successfully identify a tag, read data from the tag, and write data to the tag. The reading zone of a reader varies depending on reader power, tag sensitivity, and physical obstructions. Readers 1002-1006 may be positioned such that a tag exits the reading zone of one reader before entering the reading zone of the next sequential reader, or may be positioned such that a tag is within the reading zone of multiple readers simultaneously. Using multiple readers to sequentially write to a tag may speed up the tag encoding process, thereby increasing tag encoding throughput.

Process 1000 begins at time 1020, when reader 1002 detects RFID tag 910 and writes data 1008 to memory 912. The tags 902, 906, and 910 then proceed to the right, as indicated by the block arrow. At time 1030, reader 1002 detects tag 906 and writes data 1008 to memory 908. At substantially the same time, reader 1004 detects tag 910 (which was previously written-to by reader 1002). Reader 1004 may then write data 1010 to memory 912.

At time 1040, reader 1002 detects tag 902 and writes data 1008 to memory 904. At substantially the same time, reader 1004 detects tag 906 and writes data 1010 to memory 908, and reader 1006 detects tag 910 and writes data 1012 to memory 912. Subsequently, at times 1050 and 1060, reader 1004 writes data 1010 to memory 904 and reader 1006 writes data 1012 to memory 908 and memory 904.

As described above, the data 1008, 1010, and 1012 may be different portions of a code to be written to the memory field. For example, the data 1008, 1010, and 1012 may be different portions of code 920 in FIG. 9, and may overlap, be contiguous, or be supersets including one or more of the other data. If an external source such as a network server or controller provides the code, the external source may also partition the code into the different portions and distribute the different portions to different readers. In some embodiments, the readers themselves determine the partitioning of the code into different portions as well as how the different portions are distributed amongst the readers.

In some embodiments, the process 1000 includes error-checking and correcting functionality, such that a reader (e.g., reader 1004 and/or reader 1006) can determine if previous data was correctly written to a tag. In one embodiment, a reader may transmit a message indicating a tag write status to one or more subsequent readers based on the success (or failure) of its write operation on a tag. A tag's write status indicates whether one or more previous write operations on the tag have succeeded or failed. The write status may indicate the number of previous write operations performed, the success (or failure) or each of the previous write operations, reasons for write failures (if applicable), timestamps or location identifiers for previous write operations, or any other suitable information associated with previous write operations. For example, if reader 1002 does not successfully write data 1008 to tag 910, reader 1002 may transmit a write status message to reader 1004 (and/or reader 1006) indicating the write failure. The write status message may include the write status for tag 910, an identifier for tag 910, an identifier for reader 1002, an indicator for data 1008 or the data 1008 itself, and/or any other suitable information. The write status message may be transmitted through a wired connection between readers 1002-1006 or may be transmitted wirelessly to one or more of readers 1004-1006. The write status message may be transmitted directly between readers or via an intermediary (e.g., a controller).

A reader may determine the tag it will write to as well as the data it will write to the tag based on received write status messages. For example, the reader may receive a write status message with an identifier for a particular tag. If the write status message for that tag indicates that previous data were written to the tag successfully, the reader may proceed to write the next data to the tag upon detecting the tag. On the other hand, if the write status message indicates that previous data were not successfully written, upon detecting the tag the reader may re-write at least some of the previous data, may only write the next data, or may write at least some of the previous data and the next data.

In some embodiments, if the reader attempts to write data to the tag but fails or determines that previous tag writes have failed, it may initiate an error-handling procedure to indicate that the tag is problematic. The error-handling procedure may involve writing a failure indicator to the tag, sending a message to another entity (e.g., a subsequent reader, a controller, a third party, etc.), sounding an alarm, diverting the tag from the encoding line, or any other suitable action to indicate that a write error has occurred.

The write status of a tag may be stored on the tag in addition to or instead of being sent in a write status message. A subsequent reader may then read the write status stored on the tag to determine the data it should write to the tag. In one embodiment, the tag may store one or more write success/failure indicators in a memory and/or one or more tag IC registers. For example, data written to tag memory may include a PC field whose value indicates the number of successfully-written bits. A reader may therefore use values in the PC field associated with previously-written data to determine if it was correctly written. In some embodiments, a reader writing data to a tag may assert (or deassert) a flag on the tag to indicate whether the write was successful. For example, a reader may adjust the value of a dedicated write flag on the tag based on the outcome of a data write. A subsequent reader may then determine whether the previous write was successful based on the value of the write flag.

In another embodiment, a tag's write status may be represented as its inventoried/session flag value. A reader may then adjust the flag value based on the outcome of a data write. For example, if a data write was successful, the reader may place a tag into a first inventoried state by adjusting a tag session flag to "B". If the write was unsuccessful, the reader may place the tag into a second inventoried state by adjusting the tag session flag to (or leaving it in) "A". A subsequent reader may then be able to determine the success of the data write by determining the inventoried state of the tag using the tag session flag.

In one embodiment, any previously-written data stored on the tag serves to indicate the tag's write status. A reader may read the previously-written data to determine whether it has been written correctly. The reader may determine that the data is correct by, e.g., comparing it to a desired data value stored at the reader or retrieved from a remote location. The reader may also determine that the data is correct by detecting whether the data was written strongly enough on the tag. Incorrectly-written data and/or weakly-written data may serve as a write status message indicating that the data was unsuccessfully written.

In one example, an individual reader may write multiple codes (or portions of codes) to a tag to indicate the tag's write status. For example, a first reader (e.g., reader 1002) may write a first code (e.g., data 1008) to a tag. Subsequently, the first reader may determine if the first code was written correctly. If so, the first reader then writes a second code (e.g., data 1010) to the tag. When a second reader detects the tag, it may check to see which codes were previously written to the tag. The presence of both the first code and the second code (or just the second code) on the tag implies that the first code was correctly written, because the first reader writes the second code only if it determines that the first code was correctly written.

If the second reader detects the second code (with or without checking for the first code), it may check if the second code was written correctly. If the second code was not written correctly, the second reader may rewrite the second code. In some embodiments, the second reader may rewrite the second code regardless. After checking that the second code was written correctly, the second reader may then write a third code (e.g., data 1012) to the tag to indicate to future readers that the second code was written correctly.

On the other hand, if the second reader only detects the first code on the tag, it may check if the first code was written correctly. If the first code was not written correctly, the second reader may rewrite the first code. In some embodiments, the second reader may rewrite the first code regardless. Subsequently, after checking that the first code was written correctly, the second reader may then write the second code.

While the readers in the example above each write two codes to each tag, in some embodiments, a reader may be able to write more codes to a tag. For example, checking if a code was written correctly may be faster than writing the code. So, if the first reader wrote both the first code and the second code to the tag, and the second reader determines that the second code was written correctly, it may save time by not have to rewrite the second code. The time saved can then be used to write additional codes or data to the tag. In some embodiments, a reader may perform multiple writes of the same data to a single tag if time permits to ensure that the data is written strongly enough to tag memory.

In other embodiments, the write status of a tag may be indicated on the tag itself. For example, the tag may be physically or visually marked to indicate if a previous write succeeded (or failed). A reader may then detect the physical marking with, e.g., an optical scanner, to determine if data was correctly written onto the tag.

The movement of the tags past the readers on the encoding line may be adjusted based on write successes or failures. For example, if readers are failing to successfully write data portions to passing tags, the speed of tag movement may be decreased. On the other hand, if tag data writes are succeeding and it is determined that tag throughput can be increased without reducing write success, tag movement speed may be increased. In some embodiments, an individual tag that is problematic (i.e., readers have failed to write to the tag one or more times) may be diverted from the encoding line.

While only three tags and three readers are depicted in FIG. 10, more or fewer tags and/or readers may be involved in a tag writing process as described. In some embodiments, one or more additional gatekeeper readers may be used to catch and correct tag write failures. The total number of readers may be based on the portions of code that are to be written to the tag. For example, if three readers are each configured to write one code portion to the tag (as depicted in FIG. 10), at least one additional gatekeeper reader may be included after the three readers to catch and correct tag write failures. In some embodiments, when a gatekeeper reader detects a tag it may check whether data was correctly written to the tag and (a) pass the tag if so, (b) rewrite the data if not, or (c) fail the tag if not.

Figure 11:
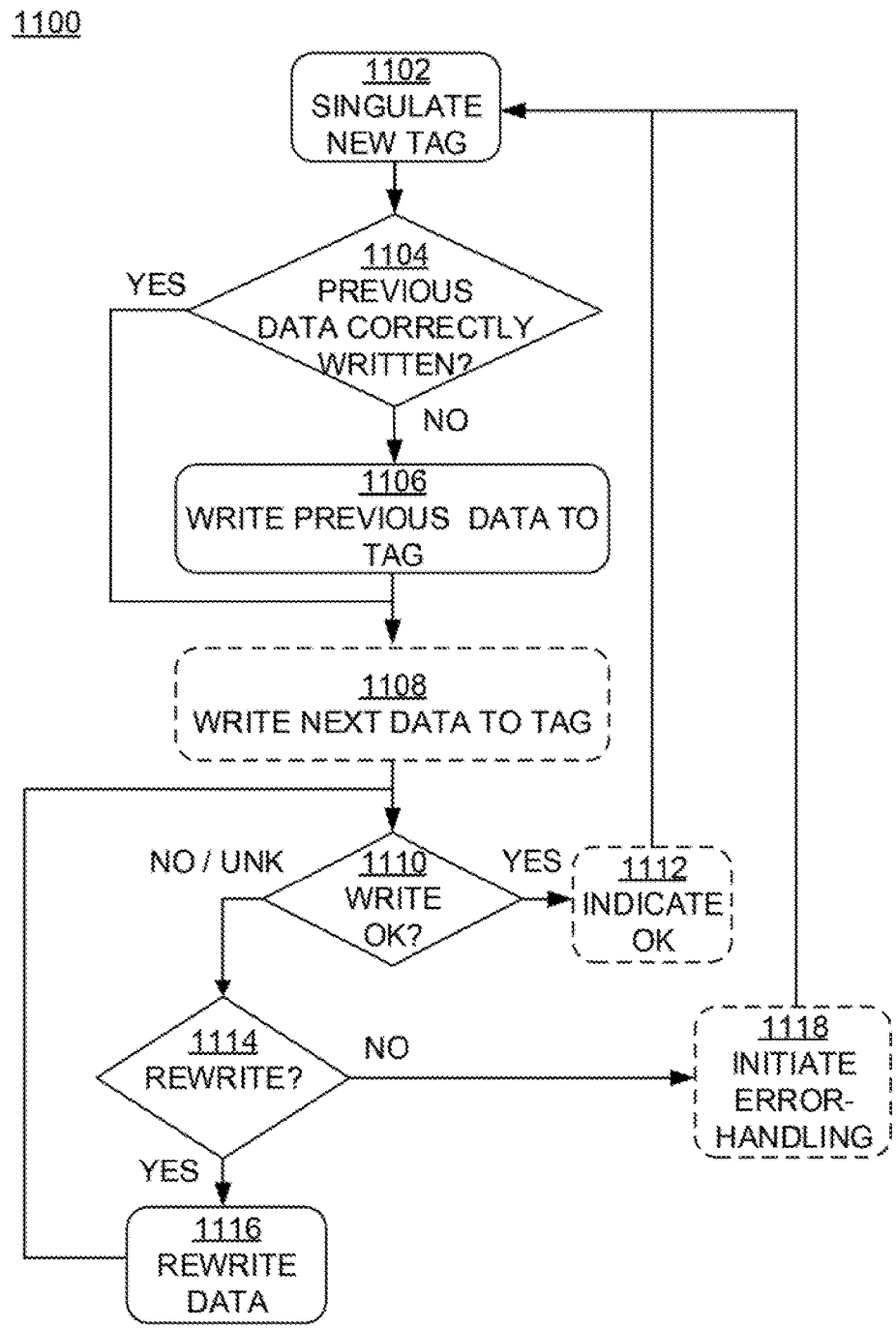
FIG. 11 is a flowchart for a process for writing data to RFID tags according to embodiments.

FIG. 11 is a flowchart for a process 1100 for writing data to RFID tags according to embodiments. Process 1100 begins with step 1102, where a new tag is singulated by a reader (e.g., reader 1002, 1004 or 1006 in FIG. 10). In step 1104, the reader checks to see if previous data has been written correctly, as described above in relation to FIG. 10. For example, referring to FIG. 10, reader 1004 may check the tag's write status in received write status messages and/or the tag memory to see if reader 1002 correctly wrote data 1008 into the tag. In some embodiments, there may be no previous data, such as would be the case for reader 1002. If the previous data was correctly written, the reader may proceed to step 1108. On the other hand, if the reader determines that the previous data was not or incorrectly written, the reader may rewrite the previous data to the tag in step 1106 and then proceed to step 1108.

In optional step 1108, the reader may write next data to the tag if time permits The next data may be data that has been assigned for the reader to write to tags (e.g., data 1008 for reader 1002, data 1010 for reader 1004, or data 1012 for reader 1006 in FIG. 10). Subsequently, in step 1110, the reader checks to see if data was written correctly in step 1108 (and step 1106, if the reader rewrote the previous data). If the reader determines that the data was written correctly, the reader may indicate that the write was correct in step 1112 by, for example, sending a message indicating write status to other readers or storing a write status indicator to the tag. The reader then proceeds to step 1102 to singulate a new tag.

On the other hand, if in step 1110 the reader cannot determine that the data was written correctly to the tag, in a subsequent step 1114 the reader determines if the data should be rewritten and/or if sufficient time remains for the reader to perform a rewrite. If not, the reader proceeds to step 1118, where it may initiate an error-handling procedure, as described above. Subsequently, the reader proceeds to step 1102 and singulates a new tag.

If instead the reader determines in step 1114 that the data should be rewritten, it may then rewrite the data in step 1116. Subsequently, the reader may again check to see if the data was written correctly at step 1110.

The steps described in process 1100 are for illustrative purposes only. Multiple readers may write data to an RFID IC employing additional or fewer steps and in different orders using the principles described herein. Of course the order of the steps may be modified, some steps eliminated, or other steps added according to other embodiments.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented, according to embodiments formed, individually and/or collectively, by a wide range of hardware, software, firmware, or virtually any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

We claim:

1. A method for sequentially encoding a Radio Frequency Identification (RFID) integrated circuit (IC) by a system comprising a first reader situated on an encoding line, a second reader situated subsequent to the first reader on the encoding line, and a third reader situated subsequent to the second reader on the encoding line, the method comprising:
   writing, via the first reader, a first portion of a code to a first IC memory location, wherein the code is at least one of a product code and an identifier;
   sending, from the first reader, a first IC write status to at least the second reader based on whether the first portion was successfully or unsuccessfully written to the IC;
   determining, at the second reader and based on the first IC write status, that the first portion was not successfully written to the IC;
   attempting, via the second reader, to one of:
      again write the first portion to the first IC memory portion; and
      write a second portion of the code, different from the first portion, to a second IC memory location, different from the first IC memory location;
   sending, from the second reader, a second write status to the third reader based at least on a result of the second reader's write attempt;
   attempting, via the third reader, to write the portion of the code not written by the second reader, such that the first and second portions, when appended, form at least part of the code; and
   initiating an error-handling procedure in response to determining that at least one of the attempts failed.

2. The method of claim 1, further comprising attempting to write, via a fourth reader situated on the encoding line, a third portion of the code, different from the first and second portions, to a third IC memory location, different from the first and second IC memory locations, such that the three portions, when appended, form at least part of the code.

3. The method of claim 1, further comprising, via a gatekeeper reader situated subsequent to the third reader on the encoding line:
   checking whether the code has been correctly written to the tag; and at least one of:
   rewriting at least a portion of the code to the IC, and
   initiating the error-handling procedure in response to determining that the code has not been correctly written to the IC.

4. The method of claim 1, wherein the first and second portions, when appended, are one of:
   contiguous, such that the first portion is after the second portion or the first portion is before the second portion;
   partially overlapping, such that a beginning of the first portion overlaps an end of the second portion or an end of the first portion overlaps a beginning of the second portion; and
   noncontiguous, such that a third portion of the code is between the first and second portions.

5. The method of claim 1, wherein the first IC write status includes at least one of a write success indicator, an identifier for the IC, an identifier for the first reader, an indicator for the code, at least part of the code, a timestamp, and an error indicator.

6. The method of claim 1, further comprising writing, via the first reader, a portion of another code to another IC while the second reader is attempting to write to the IC.

7. The method of claim 1, wherein the error-handling procedure includes at least one of writing a failure indicator to the IC, sending a message to another entity, sounding an alarm, and diverting the IC from the encoding line.

8. A method for sequentially encoding a Radio a Radio Frequency Identification (RFID) integrated circuit (IC) by a system comprising a first reader situated on an encoding line, a second reader situated subsequent to the first reader on the encoding line, and a third reader situated subsequent to the second reader on the encoding line, the method comprising:
    attempting, via the first reader, to write a first portion of a desired code to a first IC memory location, wherein the desired code is at least one of a product code and an identifier;
    sending, from the first reader, a first IC write status to at least the second reader based on the first reader determining that the first portion was successfully written to the IC;
    in response to receiving the first IC write status, attempting, via the second reader, to write a second portion of the desired code, different from the first portion, to a second IC memory location, different from the first IC memory location, such that the first and second portions, when appended, form at least part of the desired code;
    reading, via the third reader, a written code from at least the first and second IC memory locations;
    determining whether the written code corresponds to the desired code; and
    initiating an error-handling procedure in response to determining that written code does not correspond to the desired code.

9. The method of claim 8, wherein the first and second portions, when appended, are one of:
    contiguous, such that the first portion is situated after the second portion or the first portion is situated before the second portion;
    partially overlapping, such that a beginning of the first portion overlaps an end of the second portion or an end of the first portion overlaps a beginning of the second portion; and
    noncontiguous, such that a third portion of the desired code is situated between the first and second portions.

10. The method of claim 8, wherein:
    the first IC write status includes at least one of a write success indicator, an identifier for the IC, an identifier for at least one preceding reader, an indicator for the code, at least part of the code, a timestamp, and an error indicator; and
    the first IC write status is received through at least one of a wired connection, a wireless connection, and the IC.

11. The method of claim 8, wherein the error-handling procedure includes at least one of writing a failure indicator to the IC, sending a message to another entity, sounding an alarm, and diverting the IC from the encoding line.

12. The method of claim 8, further comprising writing a third portion of the desired code to a third portion of the IC memory, wherein the first, second, and third portions, when appended, form at least part of the desired code.

13. The method of claim 8, further comprising writing, via the first reader, a portion of another code to another IC while the second reader is attempting to write to the IC.

14. A method for sequentially encoding Radio Frequency Identification (RFID) integrated circuits (ICs), the method comprising:
    at a first time:
        writing a first portion of a desired code to a first IC memory location, wherein the desired code is at least one of a product code and an identifier; and
        generating a first IC write status based on whether the first portion was successfully or unsuccessfully written to the IC;
    at a second time subsequent to the first time:
        attempting to write a second portion of the desired code, different from the first portion, to a second IC memory location, different from the first IC memory location, such that the first and second portions, when appended, form at least part of the desired code; and
        generating a second IC write status based on whether the second portion was successfully or unsuccessfully written to the IC; and
    initiating an error-handling procedure in response to determining that at least one of:
        the first IC write status indicates that the first portion was unsuccessfully written;
        the second IC write status indicates that the second portion was unsuccessfully written; and
        a written code read from the IC does not correspond to the desired code.

15. The method of claim 14, further comprising:
    at a third time subsequent to the second time:
        attempting to write a third portion of the desired code, different from the first and second portions, to a third IC memory location, different from the first and second tag memory locations, such that the three portions, when appended, form at least part of the desired code; and
    initiating the error-handling procedure in response to determining that the attempt to write the third portion failed.

16. The method of claim 14, wherein the first and second portions, when appended, are one of:
    contiguous, such that the first portion is situated after the second portion or the first portion is situated before the second portion;
    partially overlapping, such that a beginning of the first portion overlaps an end of the second portion or an end of the first portion overlaps a beginning of the second portion; and
    noncontiguous, such that a third portion of the desired code is situated between the first and second portions.

17. The method of claim 14, wherein the first IC write status includes at least one of a write success indicator, an identifier for the IC, an identifier for the first reader, an indicator for the desired code, at least part of the desired code, a timestamp, and an error indicator.

18. The method of claim 14, further comprising, at the second time, attempting to write a portion of another desired code to another IC while attempting to write the second portion of the desired code to the IC.

19. The method of claim 14, wherein the error-handling procedure includes at least one of writing a failure indicator to the IC, sending a message to another entity, sounding an alarm, and diverting the IC from the encoding line.

* * * * *